UNITED STATES PATENT OFFICE.

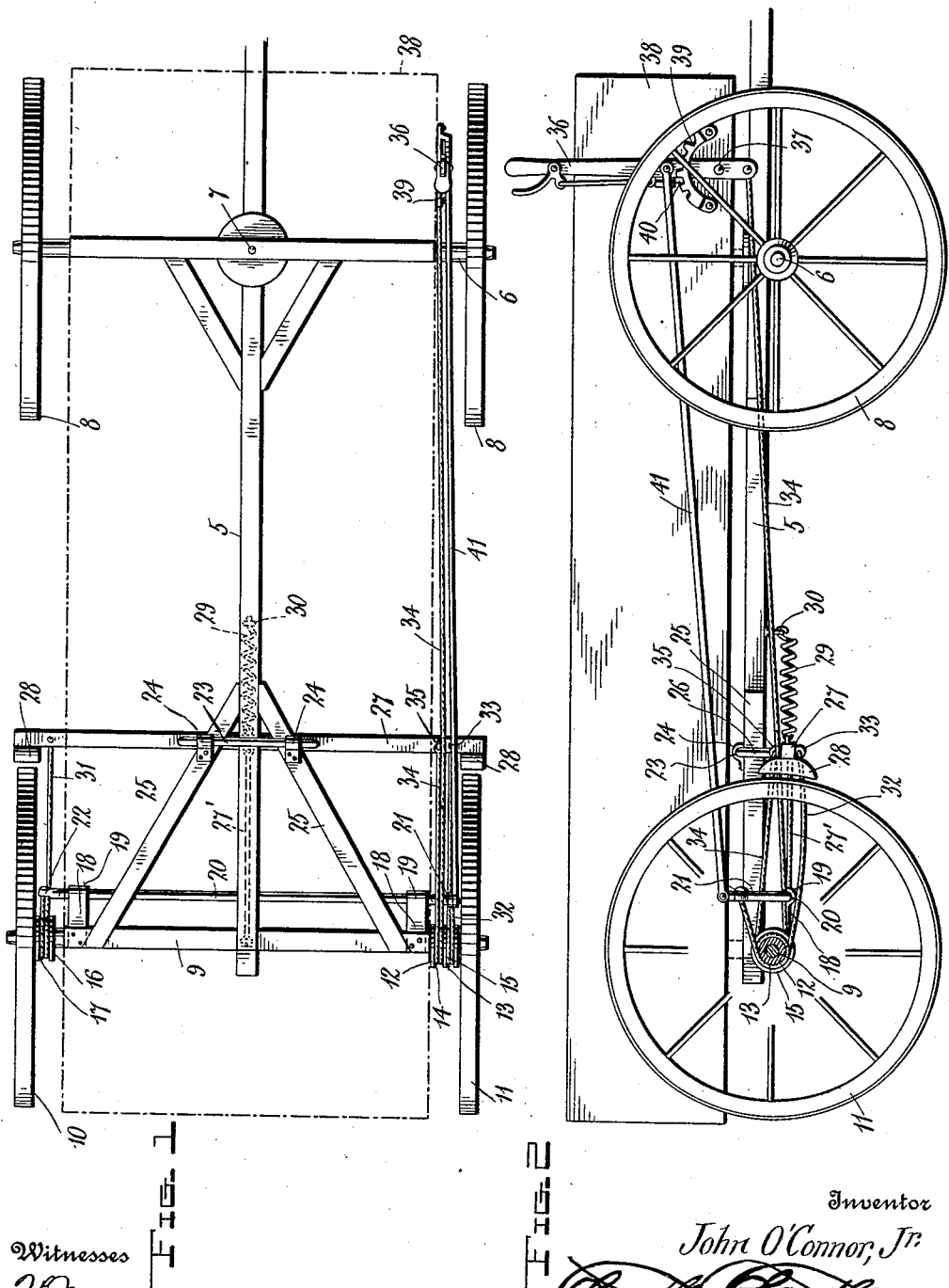

JOHN O'CONNOR, JR., OF EXCELSIOR, WISCONSIN.

VEHICLE-BRAKE.

1,000,113.  Specification of Letters Patent.  Patented Aug. 8, 1911.

Application filed November 14, 1910. Serial No. 592,332.

*To all whom it may concern:*

Be it known that I, JOHN O'CONNOR, Jr., a citizen of the United States, residing at Excelsior, in the county of Richland, State of Wisconsin, have invented certain new and useful Improvements in Vehicle-Brakes; and I do hereby declare the following to be a full, clear, and exact description of the invention, such as will enable others skilled in the art to which it appertains to make and use the same.

This invention relates to improvements in vehicle brakes and the leading object of the invention is to provide a brake mechanism having a flexible braking element wound around a hub drum, whereby the rotation of a wheel can be impeded by tightening the flexible element on the drum.

Another object of the invention is to provide a brake mechanism for vehicles, having a pair of flexible braking cables wound around the wheel drums and means for simultaneously tightening the cables whereby the rotation of the wheels can be impeded.

With the above and other objects in view the invention consists in certain constructions, combinations and arrangements of parts, clearly described in the following specification and clearly illustrated in the accompanying drawings, in which:—

Figure 1 is a top plan view of the running gear of a vehicle showing the improved braking means applied thereto and the vehicle box being shown in dotted lines, and Fig. 2 is a side elevation showing the vehicle box in section lines.

Referring to the accompanying drawings 5 denotes the reach bar and 6 the front axle which is pivoted by the king bolt 7 and on the ends of which the traction wheels 8 are journaled.

The rear axle 9 is secured to the rear end of the reach bar 5 and on the ends of said rear axle 9 the traction wheels 10 and 11 are journaled, the traction wheels 11 being formed with a hub 12 having circumscribing grooves 13 and 14, which are spaced from each other by a medially disposed collar 15. The traction wheel 10 is formed with a hub 16 having a single circumscribing groove 17. On the rear axle 9 bearing straps or brackets 18 are mounted, said brackets or straps being located near the ends of said axle and extending forwardly thereof. On the forward ends of the straps or brackets 18 which forward ends are formed into loops 19 a rock shaft 20 is journaled, said rock shaft 20 being provided with angular ends 21 and 22 which extend above the axle 9. Forwardly of the rock shaft 20 a supporting rod 23 is pivotally secured in the bearing brackets 24 which are mounted on the horizontal braces 25 of the running gear and said supporting rod 23 is formed with depending ends 26 which are bolted to the transversely disposed brake beam 27. On the ends of the brake beam 27 brake shoes 28 are rigidly secured and said brake shoes are normally supported in front of the rear wheels 10 and 11. The brake beam 27 is connected to the rear end of a coiled spring 29 which extends forwardly and is connected at its forward end to the eye bolt 30 which bolt is secured on the reach bar 5. By means of the spring 29 the brake shoes 28 are held normally in front of the rear wheels 11.

A flexible cord or cable 31 is secured at its forward end to one end of the brake beam 27 and is wound around a hub 16 of the wheel 10 and in the recess 17 of said hub, and the rear end of said flexible rope or cable 31 is connected to the angular arm 22 of the rock shaft 20. The angular arm 21 of the rock shaft 20 is connected to a second flexible rope or cable 32, and said flexible rope or cable 32, is wound around the hub 12 of the wheel 11 and in the recess 13 of said hub 12, the forward end of the flexible rope or cable 32 being secured at 33 to the brake beam 27. A second flexible rope or cable 34 is wound around the hub 12 in the recess 14 while the forward end of the cable 34 extends forwardly and is connected to the lower end of the operating or throw lever 36 which is pivoted at 37 to the vehicle box 38. The operating or throw lever 36 operates against a guide and clutch rack 39 and is provided with the conventional clutch pawl 40. The lever 36 is pivotally connected with a rearwardly extending rod 41 which is pivotally connected at its rear end to the terminal of the angular arm 21 of the rock shaft 20. A flexible cable 27′ is connected at its rear end to the rear axle 9 and at its forward end to the brake beam 27.

When the operating or throw lever 36 is moved forwardly the outer flexible cables or ropes 31 and 32 will be tightened about the hubs 12 and 16, and when said operating or throw lever 36 is moved rearwardly the intermediate flexible cable or rope 34 will be tightened about the hub 12. In the former case the wheel will be prevented from rotating in a forward direction and in the latter case the wheel 11 will be prevented from rotating in a rearward direction. The tightening of the flexible cables 31 and 32 about the hubs 12 and 16 of the wheels 11 and 10 respectively bring the shoes 28 of the brake beam 27 against said wheels 11 and 10 and the rotation of the rear wheels will be consequently effectively resisted.

What is claimed is:—

In a vehicle brake mechanism the combination with a vehicle including a rear axle, wheels journaled thereon and a running gear, of brackets carried by said rear axle, a rock shaft journaled in said brackets and having an angularly disposed terminal, a second rock shaft journaled in the running gear and having its terminals bent at an angle to the intermediate portion thereof, a brake beam carried by the terminals of the second named rock shaft, brake shoes mounted on said brake beam in operative relation to the rear wheels of the vehicle respectively, an operating lever pivoted intermediate its ends on the body of the vehicle, a cable wound around the hub of one of the rear wheels and having one end secured to the operating lever beneath its pivot point and its other end secured to the brake beam, a second cable wound around the hub of one of the rear wheels and having one end secured to the angularly disposed terminals of the first named rock shaft and its other end to the brake beam, and a link connecting the angularly disposed terminals of the first named rock shaft and the operating lever, said link being connected to the latter above its pivot point.

In testimony whereof, I affix my signature, in presence of two witnesses.

JOHN O'CONNOR, Jr.

Witnesses:
 THOS. O'CONNOR,
 MYRON E. BROWN.

---

Copies of this patent may be obtained for five cents each, by addressing the "Commissioner of Patents, Washington, D. C."